C. A. MONROE.
COMBINED PROPULSION AND STEERING MEANS FOR VEHICLES.
APPLICATION FILED JULY 1, 1916.

1,246,452.

Patented Nov. 13, 1917.
3 SHEETS—SHEET 3.

Witness
Stuart Hilder

Inventor,
C. A. Monroe.
E. W. Anderson
his Attorneys

UNITED STATES PATENT OFFICE.

CHALMERS A. MONROE, OF LEAVENWORTH, KANSAS.

COMBINED PROPULSION AND STEERING MEANS FOR VEHICLES.

1,246,452.  Specification of Letters Patent.  Patented Nov. 13, 1917.

Application filed July 1, 1916. Serial No. 107,075.

*To all whom it may concern:*

Be it known that I, CHALMERS A. MONROE, a citizen of the United States, resident of Leavenworth, in the county of Leavenworth and State of Kansas, have made a certain new and useful Invention in Combined Propulsion and Steering Means for Vehicles; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
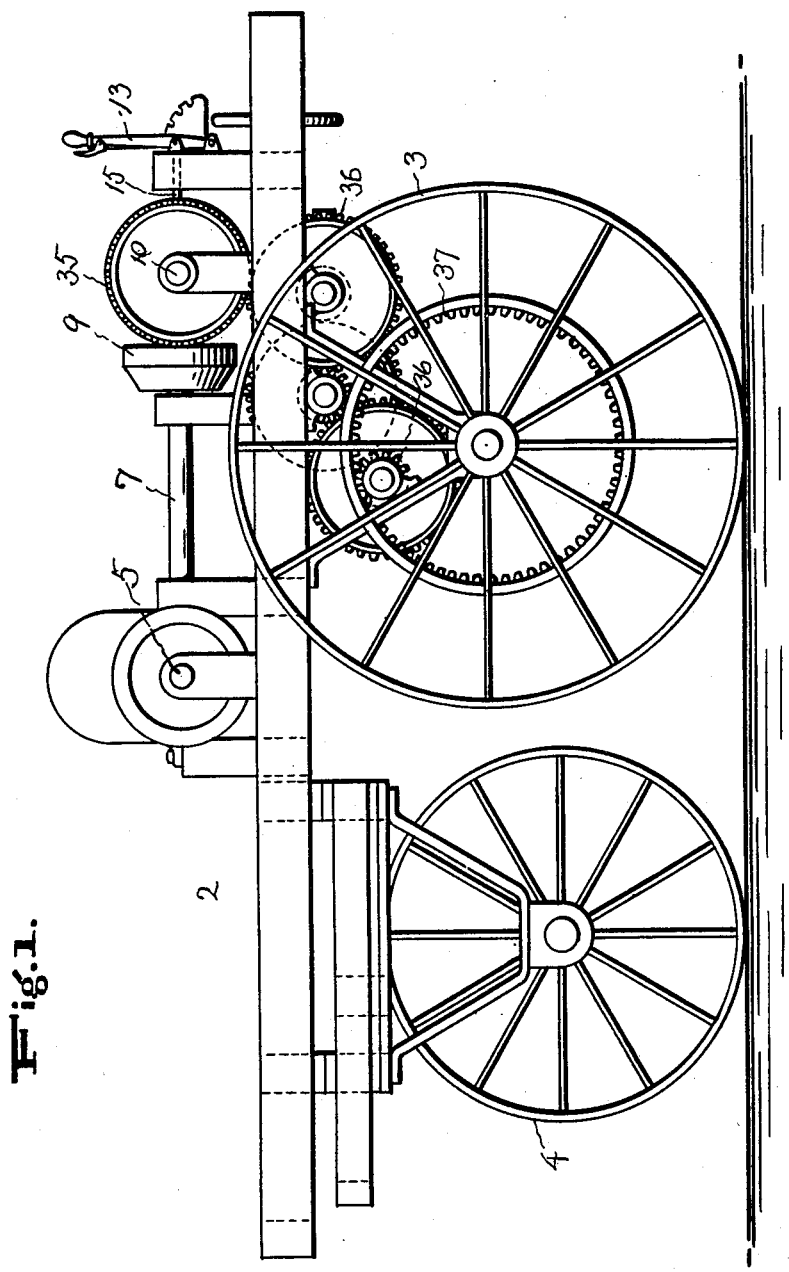
Figure 1 is a side view of the invention as applied.
Figure 2:
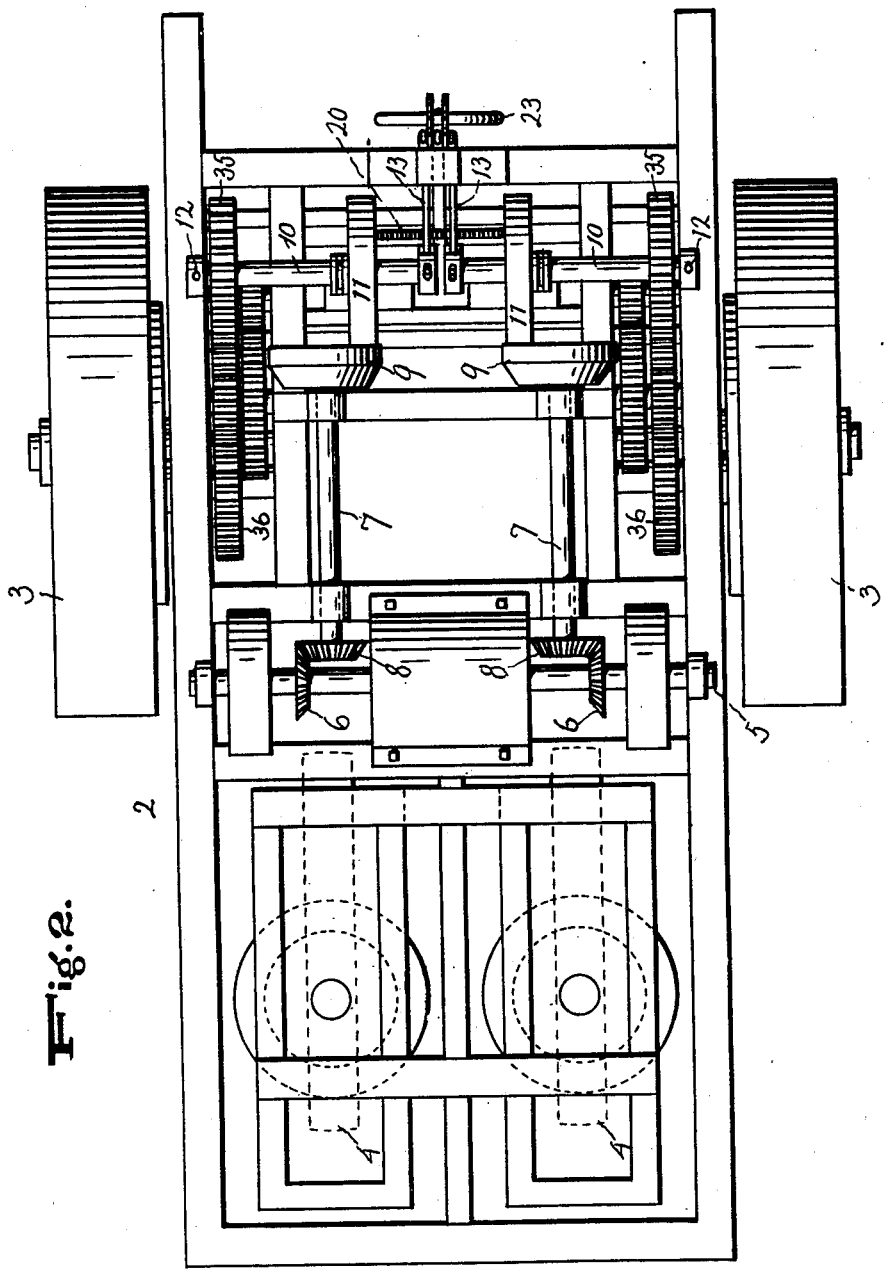
Fig. 2 is a plan view of the same.
Figure 3:
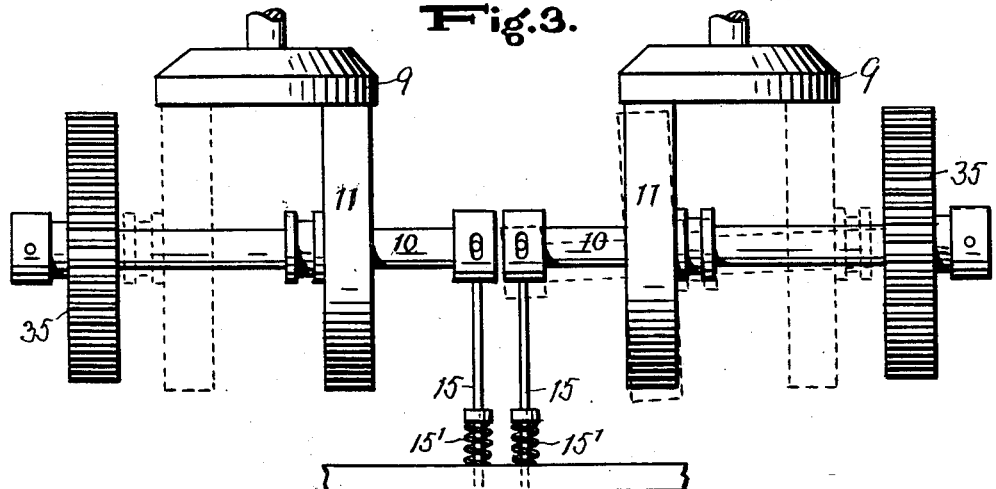
Fig. 3 is a detail plan view of the transverse shafts, the driver and driven disks, and the means for adjusting said shafts pivotally, parts being broken away.
Figure 4:
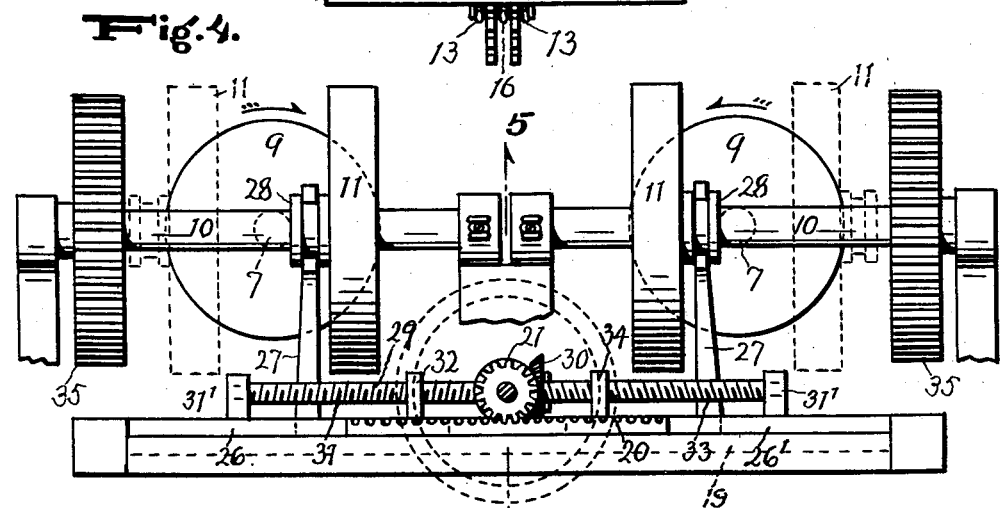
Fig. 4 is a detail front view of the transverse shafts, the driver and driven disks and the means for adjusting the driven disks laterally, parts being broken away.
Figure 5:
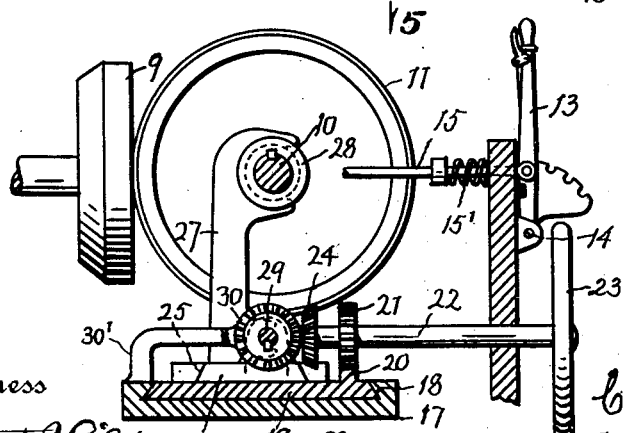
Fig. 5 is a section on the line 5—5, Fig. 4.

The invention has relation to power transmission mechanism for vehicles, vessels, and the like, having for its object to provide improved means of simple and practical nature for propelling in two directions, or both forwardly and rearwardly, at speeds variable at will, and for turning in the smallest space possible, and at speeds also variable at will.

The invention consists in the novel construction and combinations of parts as hereinafter set forth.

In the accompanying drawings illustrating the invention, the numeral 2, designates a farm tractor, to which the invention is shown as applied; 3 are the large traction wheels at one end of said tractor, and 4 are smaller caster wheels at the opposite end of the tractor.

In order to drive the traction wheels, the transverse engine shaft 5, is provided with connections as follows:

Longitudinal shafts 7, one at each side of the machine are provided with a drive connection with shaft 5, usually bevel gears 6 and 8, said longitudinal shafts having at one end each a large driver friction disk 9.

10 represents short transverse shafts, one at each side of the machine, and each carrying at one end thereof a large driven friction disk 11, movable transversely across the face of the disk 9 from one side to the other, both driven disks being moved in the same direction simultaneously, or both in opposite directions simultaneously by the following means.

The short shafts 10 are each pivoted at the outer end thereof at 12, to the framing, and may be moved upon said pivots as centers, to carry the friction disks away from or toward the driver disks, for disengagement or engagement of the disks.

13 are hand levers, fulcrumed respectively at 14, and having each a rod connection 15 with the inner ends of the shafts 10, to accomplish, independently, the pivotal movement of said shafts. A hand lever 16 is located between the levers 13, and when actuated will engage both levers 13, and accomplish simultaneously the adjustment thereof, to simultaneously move the shafts 10, pivotally.

A transverse bed plate 17, underlies the shafts 10, upon the framing, and mounted upon said bed plate in guides 18, thereof, is a transverse slidable plate 19, having centrally thereof, a rack 20, with which is adapted to mesh a pinion 21 of a short longitudinal shaft 22, said shaft being provided at its outer end with a hand wheel 23, and at its inner end with a bevel gear 24.

At opposite end portions of the plate 19 are mounted in guides 25, slidable plates 26, 26', each carrying a standard 27, engaging respectively the grooves of collars 28, upon the wheels 11. A transverse shaft 29, carries a bevel gear 30, with which the gear 24 is adapted to mesh, said shaft having one half thereof threaded at 31, and engaging an upstanding lug 32 of the plate 26, and the other half thereof oppositely threaded at 33, and engaging an upstanding lug 34 of the plate 26'.

The shafts 10 have suitable driving connection with the traction wheels, usually gear wheels 35 upon each shaft 10, and each driving a chain of gears 36, the endmost of which engages the teeth of internally threaded gears 37 upon the traction wheels.

The friction disks 11 are located both either at the inner sides of the disks 9, for a rapid movement of the vehicle in one direction, as forward, or both at the outer sides of the disks 9, for a rapid movement of the vehicle in the opposite direction, the gear 24 being in mesh with the gear 30, so that the disks 11 may be laterally moved, both together, in opposite directions to the centers of the wheels 9, for stopping purposes, or for turning as hereinafter stated; or to the opposite sides of the disks 9, to reverse the movement of the vehicle, the speed gradually decreasing as the disks 11 are moved toward the centers of the disks 9, and gradually increasing as the disks 11 are moved away from the centers of the disks 9.

Normally the friction disks 11 may be midway of the disks 9, for half speed, to be increased or decreased as desired. The friction disks 11, being located at the centers of the disks 9, with the gears 24 and 30 in mesh, shifting of the disks 11 to one side or the other of said centers, will accomplish a movement of the vehicle straight ahead or straight backward. The gear 21, being in mesh with the rack 20, hand wheel 23 may be operated to effect a rotation of the shaft 29 and move slidable plate 19, with plates 26 and 26' thereupon, endwise, and shift the disks 11 laterally from positions at centers of the disks 9, and in the same direction, when said disks 11 will be driven in opposite directions to accomplish a turning movement of the vehicle. This turning operation may also be started from other positions of the disks 11, any lateral movement of said disks in the same direction causing a variation in the speed at which the tractor wheels are driven, and effecting a longer or shorter turn, according to the degree of movement.

A turn may also be accomplished by means of one of the levers 13, one disk 11 being moved out of contact with its driver disk 9, and the drive remaining effective upon the opposite side of the vehicle.

The rods 15 are moved against the tension of springs 15', thereupon, said springs bearing at one end against collars of said rods and at their opposite ends against the framing, and serving to press the driven disks against the driver disks in a yieldable but effective manner.

In order to prevent endwise movement of the threaded shaft 31, end bearings 31' upon plate 19 are provided for said shaft, and in order that the gear 30 may be held in position when said shaft is moved with the slide 19, a connection 30' with the bed plate 17 is employed, said gear 30 sliding upon said shaft, with which it has a spline connection.

In stopping, usually the lever 16 will be operated to move the shafts 10 pivotally and disengage the driven disks from the driver disks, the disengagement being instantly accomplished and serving for a quick release of the driving mechanism while the engine is in operation.

I claim:—

1. In power transmission gearing, an engine shaft, propelling wheels, shafts having driving connection with the engine shaft and driver friction disks, shafts each having driving connection with one of said propelling wheels, a driven friction disk slidable upon each of the last-named shafts and laterally movable across the face of the driver disks, and means for moving said driven disks laterally simultaneously in the same direction and simultaneously in opposite directions across said driver disks.

2. In power transmission gearing, an engine shaft, propelling wheels, shafts having driving connection with the engine shaft and driver friction disks, normally alined pivotal shafts having each driving connection with one of the propelling wheels, a driven friction disk slidable upon each pivotal shaft and laterally movable across the face of the driver disks, means for moving said driven disks laterally simultaneously in the same direction and simultaneously in opposite directions across said driver disks, and means for adjusting said pivotal shafts to disengage the driven disks from the driver disks.

3. In power transmission gearing, an engine shaft, propelling wheels, shafts having driving connection with the engine shaft and driver friction disks, normally alined pivotal shafts having each driving connection with one of the propelling wheels, a driven friction disk slidable upon each pivotal shaft and laterally movable across the face of the driver disks, means for moving said driven disks laterally simultaneously in the same direction and simultaneously in opposite directions across the faces of the driver disks, and means for adjusting said pivotal shafts independently or simultaneously to disengage the driven disks from the driver disks.

4. In power transmission gearing, an engine shaft, propelling wheels, shafts having driving connection with the engine shaft and driver friction disks, shafts each having driving connection with one of said propelling wheels, a driven friction disk slidable upon each of the last-named shafts and laterally movable across the faces of the driver disks, and means for moving said driven disks laterally simultaneously in the same direction and simultaneously in opposite directions across said driver disks, including a slidable base member, slidable upper members upon said base member and having each an actuating connection with a driven disk, and means for moving said base member, and means for moving said upper members.

5. In power transmission gearing, an engine shaft, propelling wheels, shafts having driving connection with the engine shaft and driver friction disks, shafts each having driving connection with one of said propelling wheels, a driven friction disk slidable upon each of the last-named shafts and laterally movable across the faces of the driver disks, and means for moving said driven disks laterally simultaneously in the same direction and simultaneously in opposite directions across said driver disks, including a slidable base member, slidable upper members upon said base member having each an actuating connection with a driven disk, and an operating shaft having means for moving said base member and said upper members as a whole, and means for moving said upper members independently.

6. In power transmission gearing, an engine shaft, propelling wheels, shafts having driving connection with the engine shaft and driver friction disks, shafts each having driving connection with one of said propelling wheels, a driven friction disk slidable upon each of the last-named shafts and laterally movable across the faces of the driver disks, and means for moving said driven disks laterally simultaneously in the same direction and simultaneously in opposite directions across said driver disks, including a slidable base member having a rack, slidable upper members upon said base member having each a standard engaging a driven disk and having each a lug, a shaft having a bevel gear and oppositely threaded portions engaging the respective lugs of said upper members, and an endwise slidable operating shaft having a gear adapted to engage said rack and a bevel gear for engagement with the first named bevel gear.

In testimony whereof I affix my signature, in presence of two witnesses.

CHALMERS A. MONROE.

Witnesses:
    LEE D. MONROE,
    EFFIE M. MONROE.